United States Patent [19]
Antonali et al.

[11] Patent Number: 5,528,854
[45] Date of Patent: Jun. 25, 1996

[54] PLASTIC INSECT BAIT ASSEMBLY

[75] Inventors: Louis Antonali, Moraga; John Ciolino, Salinas, both of Calif.

[73] Assignee: Grant Laboratories, Inc., San Leandro, Calif.

[21] Appl. No.: 382,809

[22] Filed: Feb. 2, 1995

[51] Int. Cl.⁶ .................................... A01M 1/20
[52] U.S. Cl. ................................. 43/131; 43/132.1
[58] Field of Search .................... 43/131, 132.1, 43/121

[56] References Cited

U.S. PATENT DOCUMENTS

| | | | |
|---|---|---|---|
| 1,729,389 | 9/1929 | Hughett | 43/131 |
| 2,547,314 | 4/1951 | Grant | 43/131 |
| 2,825,996 | 3/1958 | Grant | 43/131 |
| 2,893,160 | 7/1959 | Grant | 43/131 |
| 4,065,872 | 1/1978 | Patton et al. | 43/131 |
| 4,485,582 | 12/1984 | Morris | 43/131 |

Primary Examiner—J. Elpel
Attorney, Agent, or Firm—Flehr, Hohbach, Test, Albritton & Herbert

[57] ABSTRACT

An insect bait assembly (10) for retaining a volume of insect bait (16) which includes an elongate support body (12) having spaced ends (26, 28), an upper surface (22) and a lower surface (24), and a reservoir (14) monolithically formed with the support body (12). The reservoir (14) has a peripheral wall (34) extending upwardly from the upper surface (22) of the support body (12) and substantially surrounding and defining an interior cavity (36) for holding the volume of insect bait (16). The support body (12) has a reinforced region (58) configured for strengthening the support body (12) and resisting bending of the support body (12) proximate the reservoir (14).

18 Claims, 3 Drawing Sheets

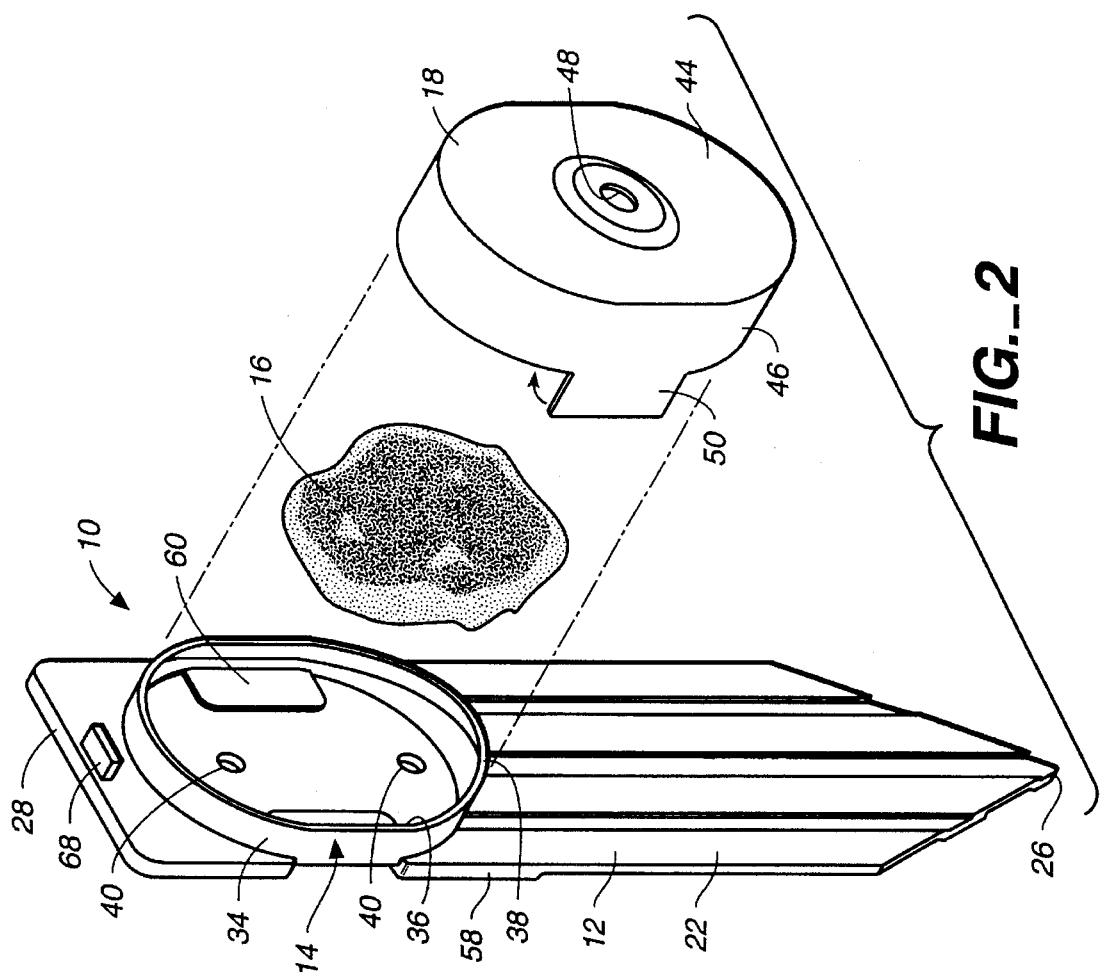
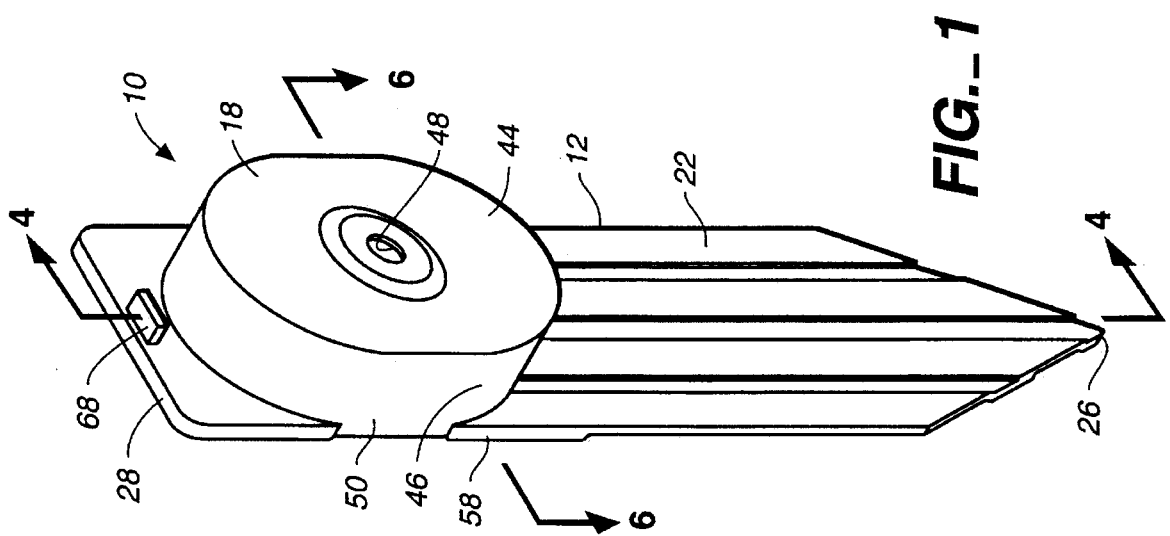

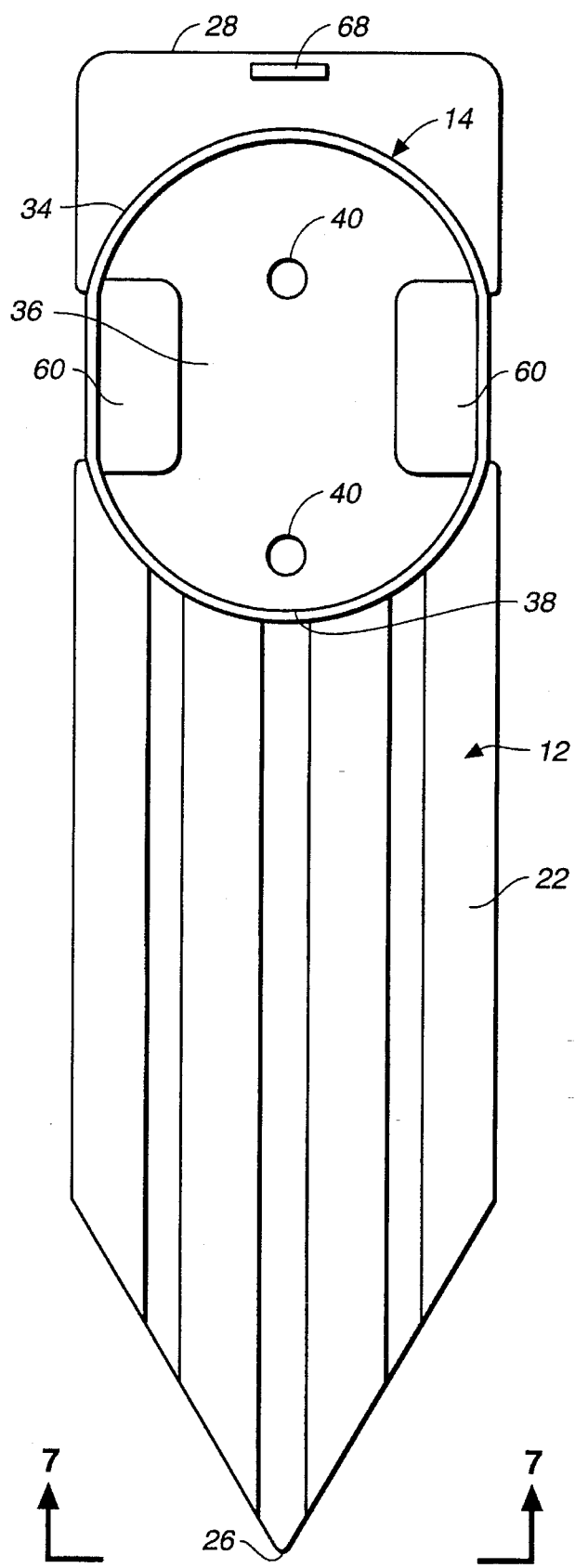
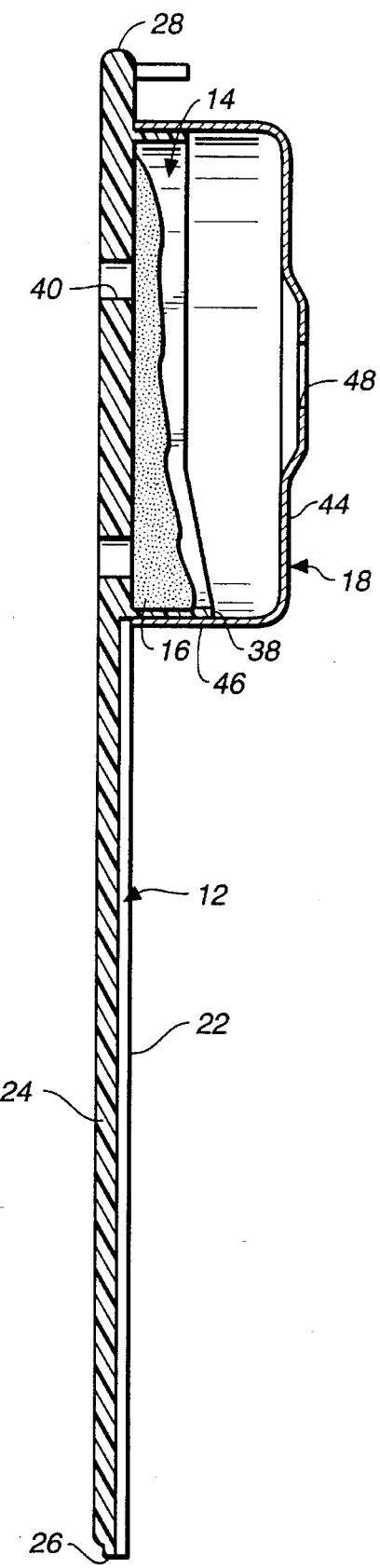
FIG._3   FIG._4

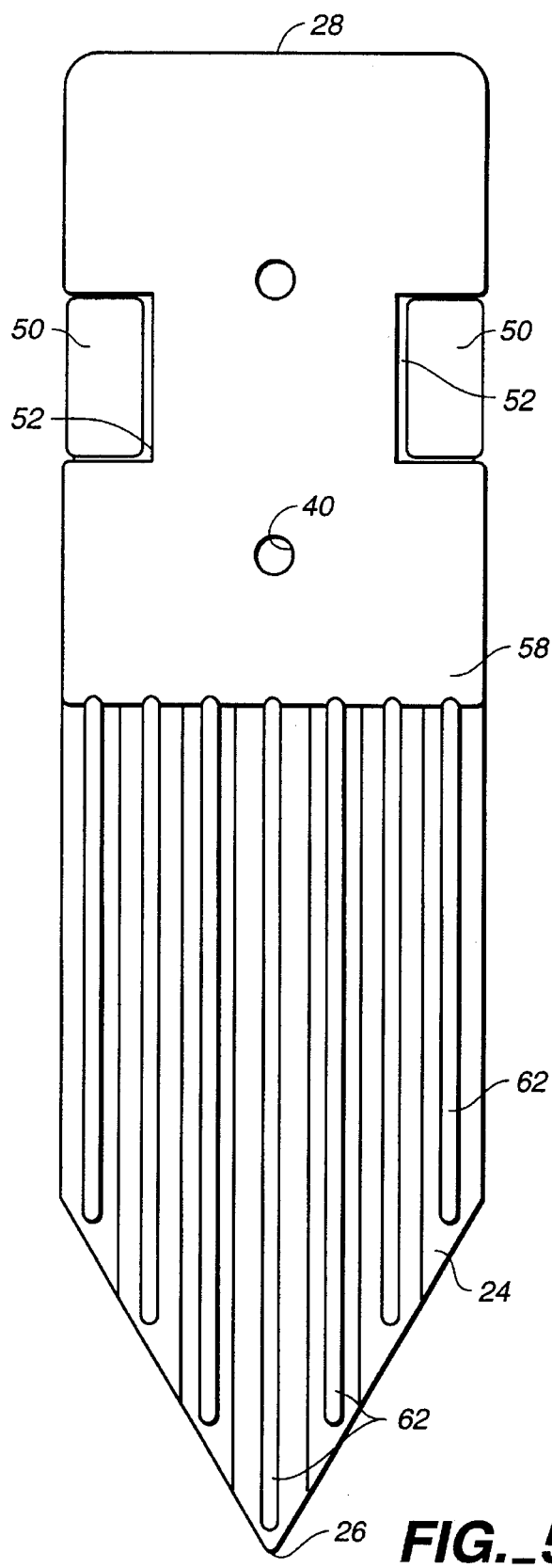
FIG._5
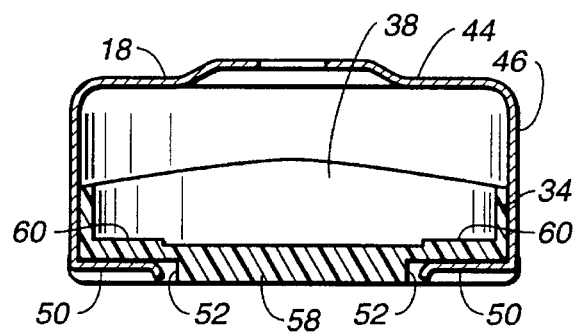
FIG._6
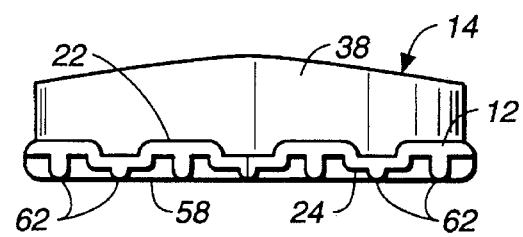
FIG._7

PLASTIC INSECT BAIT ASSEMBLY

TECHNICAL FIELD

The present assembly relates in general to an assembly for holding insect bait. More particularly, the present invention relates to a plastic insect bait assembly.

BACKGROUND ART

Undesirable insects such as ants may be controlled or eliminated by positioning poison or bait within reach of the insects. For safety and convenience, an individual dose of bait is often packaged in a housing which provides insects with access to the bait while minimizing user contact with the poison. When the housing is positioned in an insect infested area, the insects are attracted to the poison within the housing.

One example of such an insect bait device includes a metal stake and a metal cup which has been filled with an application of poison and secured to the stake. The metal bait device may be deployed in the garden or outside of a building by pushing the metal stake into soil or other ground materials. The device may also be positioned in the infested area by lying the device on hard surfaces such as concrete, decks, floors, cupboard shelves, countertops, etc. With the metal stake, the metal bait device may be conveniently used indoors and outdoors to control or eliminate undesirable insects.

Forming the stake and poison retaining cup of metal provides a strong, durable, long-lasting insect bait device. However, plastic materials have various properties or characteristics which would be of particular advantage in insect bait assemblies. Using plastic materials would allow the device to be efficiently molded to the desired shape. The bait device may have the poison-retaining reservoir monolithically formed with the body of the device instead of the cap, minimizing potential human contact with the poison during manufacture and assembly of the device. The molded device would have smooth edges and would be substantially rust resistant. Furthermore, the molded device may be configured to facilitate the automatic filling of the device with poison or bait and/or the automatic assembly of the device.

Accordingly, an insect bait assembly which has a poison-retaining reservoir monolithically formed with the support body is highly desirable. Similarly, an insect bait assembly which may be formed of a plastic material is highly desirable. A plastic bait assembly which is as strong, durable and long lasting as a comparable metal device is also desirable. An insect bait device which may be configured for automatically filling and assembling the device is also highly desirable. In addition, an insect bait assembly which may be molded with smooth or rounded edges would be particularly useful.

A primary object of the invention, therefore, is to provide an insect bait assembly which includes a one-piece body having a reservoir for holding an application of poison and a support body.

A further object of the invention is to provide an insect bait assembly which may be molded of plastic.

Another object of the present invention is to provide an insect bait assembly which is configured to facilitated the automatic filling of the assembly with an application of insect bait.

Yet another object of the present invention is to provide an insect bait device which is configured to facilitate the automatic assembly of the device.

Still another object of the present invention is to provide a plastic bait assembly which is as strong, durable and long lasting as a bait assembly formed of metal.

A more general object of the present invention is to provide an insect bait assembly which may be efficiently molded to the desired shape and economically manufactured, and which has smooth edges and is substantially rust resistant.

The apparatus of the present invention has other objects and features of advantage which will become apparent from and are set forth in more detail in the description of the Best Mode Of Carrying Out The Invention and the accompanying drawings.

DISCLOSURE OF THE INVENTION

The insect bait assembly of the present invention is adapted for retaining an application of insect bait within an insect invested area. The bait assembly includes a one-piece body having a reservoir monolithically formed with a support body which includes an upper surface, a lower surface and spaced ends. The reservoir has a peripheral wall extending upwardly from the upper surface of the support body. The peripheral wall substantially surrounds and defines an interior cavity for holding a volume of insect bait. The support body has a reinforced region configured for strengthening the support body and resisting bending of the support body proximate the reservoir.

BRIEF DESCRIPTION OF THE DRAWINGS

FIG. 1 is an isometric view of an insect bait assembly constructed in accordance with the present invention.

FIG. 2 is an exploded isometric view of the insect bait assembly of FIG. 1.

FIG. 3 is an enlarged, top plan view of the support body of the insect bait assembly of FIG. 1.

FIG. 4 is an enlarged, cross sectional view taken along the plane of line 4—4 in FIG. 1.

FIG. 5 is an enlarged, bottom plan view of the insect bait assembly of FIG. 1.

FIG. 6 is an enlarged, cross sectional view taken along the plane of line 6—6 in FIG. 1.

FIG. 7 is an enlarged, front elevational view taken substantially along the plane of line 7—7 in FIG.

BEST MODE OF CARRYING OUT THE INVENTION

Reference will now be made in detail to the preferred embodiments of the invention, which are illustrated in the accompanying Figures. Turning now to the drawings, wherein like components are designated by like reference numerals throughout the various figures, attention is directed to FIGS. 1 and 2.

A plastic insect bait assembly 10, constructed in accordance with the present invention, is adapted for safely retaining an application of insect bait or poison in an insect infested area. Insect bait assembly 10 generally includes an elongate support body 12 having a monolithically formed reservoir 14 for retaining an application of insect bait or poison 16. Preferably, bait 16 is in the form of a gel or other viscous substance to facilitate transfer of bait 16 from bait assembly 10 to the insect colony and to ensure the bait will not seep from bait assembly 10. A reservoir cover or cap 18 covers reservoir 14 to securely hold bait 16 within reservoir 14.

As is shown particularly in FIGS. 2 and 3, support body 12 extends longitudinally from two sides of reservoir 14 and has an upper surface 22, a lower surface 24 and first and second spaced ends 26 and 28. Reservoir 14 is spaced from first end 26 and is positioned proximate second end 28 of support body 12. Bait assembly 10 may be deployed by supporting lower surface 24 on a generally horizontal surface as for example a counter, shelf, floor, deck, patio, etc. Bait assembly 10 may also be deployed by pushing support body 12 into the ground, soil or other material. First end 26 of support body 12 is preferably tapered to a point as shown in the figures to facilitate insertion of support body 12 into the soil. The transverse second end 28 may be used to drive support body 12 into the soil by striking second end 28 with a hammer or other tool. Preferably, reservoir 14 is spaced inwardly from second end 28 to prevent reservoir 14 and cover 18 from being hit by the hammer or other tool when support body 12 is pushed into the soil. The corrugated shape of support body 12 between reservoir 14 and pointed end 26 allows support body 12 to be easily driven into soil which has been compacted.

Reservoir 14 includes a peripheral wall 34 extending upwardly from upper surface 22 of support body 12. Peripheral wall 34 substantially surrounds and defines an interior cavity 36 for holding a volume of bait 16. As is shown particularly in FIGS. 2 and 4, portion 38 of peripheral wall 34 extending transversely across support body 12 and facing first end 26 has a greater height than the remainder of wall 34. Increasing the height of the transverse wall portion 38 ensures bait 16 will be completely contained within reservoir 14 even when bait assembly 10 is held in a vertical position as shown in Figure 4. Drainage holes 40 are formed in the bottom of reservoir 14 to permit drainage of water or other fluids from interior cavity 36 when bait 16 is deposited in reservoir 14. Depending upon the type of bait 16 used in assembly 10 and the procedures employed in filling reservoir 14 with bait 16, drainage holes 40 may be eliminated. Depending upon the placement of bait assembly 10 and the size of holes 40, drainage holes 40 may also provide the insects with access to bait 16 within reservoir 14.

Transverse wall portion 38 reinforces peripheral wall 34 and prevents bending or deformation of reservoir 14. The increased height of transverse wall portion 38 also facilitates application of cover 18 by reducing the pressure required to mount cover 18 to the one-piece support body 12 and reservoir 14. Increasing the height of transverse wall portion 38 relative to the remainder of wall 34 provides reservoir 14 with the advantages of a taller peripheral while minimizing the amount of material required to form peripheral wall 34. However, it should be understood that in other embodiments of the invention, portions of wall 34 extending longitudinally along the sides of support body 12 and facing second end 28 of the support body may have the same height as transverse wall portion 38.

Reservoir cover 18 includes a top portion 44 extending across and substantially covering internal cavity 36 of reservoir 14 and a skirt portion 46 depending downwardly from top portion 44 at a position outside of peripheral wall 34 of reservoir 14. An aperture 48 formed in top portion 44 opens into interior cavity 36 of reservoir 14, providing insects with access to the poisonous bait 16. In the illustrated embodiment, cover 18 includes one aperture 48 as it provides the insects with free access to bait 16 while minimizing the risk of a user contacting the bait within reservoir 14. However, if desired, reservoir cap 18 may include more than one aperture 48.

Reservoir cover 18 is mounted to support body 12 after an application of bait 16 has been deposited in reservoir 14. Reservoir cover 18 includes two tabs 50 initially depending downwardly from the lower edge of skirt portion 46 as shown in FIG. 2. Two recessed areas 52 are formed in lower surface 24 of support body 12 beneath reservoir 14. When cover 18 is applied to support body 12, tabs 50 are bent inwardly as shown by the arrow in FIG. 2 and folded into recessed areas 52 as is shown particularly in FIGS. 5 and 6. Positioning tabs 50 in recessed areas 52 securely fastens reservoir cover 18 to support body 12 and reservoir 14.

Reservoir 14 must be continuously covered by reservoir cap 18 to ensure that bait 16 is safely confined within interior cavity 36 out of the reach of the user, other individuals or pets. Under certain conditions, reservoir cover 18 may have a tendency to separate from reservoir 14 if reservoir 14 is bent or resiliently deformed when bait assembly 10 is handled or inserted into the ground, exposing the bait within reservoir 14. For safety, support body 12 is preferably configured to resist bending of reservoir 14. As shown in FIGS. 1, 2 and 5, support body 12 includes a reinforced region 58 having a thickness dimension for reinforcing support body 12 and resisting deformation of support body 12 proximate reservoir 14. Preferably, reinforced region 58 extends from second end 28 to a position between transverse wall portion 38 and first end 26 to increase the distance between any bending of support body 12 and reservoir 14. The thickness of reinforced region 58 is greater than the thickness of the remainder of support body 12, with the additional material reinforcing region 58 and substantially preventing deformation of reservoir 14.

Recessed areas 52 formed in lower surface 24 of support body 12 reduce the effective thickness of reinforced region 58 below reservoir 14. As shown particularly in FIGS. 2 and 3, reservoir 14 has two projections 60 extending upwardly into interior cavity 36. Projections 60 are substantially aligned with recessed areas 52 and preferably shaped substantially similar to recessed areas 52, although if desired projections 60 may be formed in other shapes. Projections 60 have a thickness selected to sufficiently strengthen the area of reservoir 14 above recessed areas 52. Projections 60 reinforce reservoir 14 without substantially increasing the amount of material required to form reservoir 14. However, if desired projections 60 may be eliminated and the thickness of the bottom of reservoir 14 increased to strengthen and prevent deformation of reservoir 14.

A plurality of longitudinally extending reinforcement ribs 62 strengthen support body 12 between pointed end 26 and reinforced region 58. As shown in Figures 5 and 7, in the illustrated embodiment support body 12 has seven ribs 62 formed on lower surface 24, one in each of the corrugated sections of support body 12. Ribs 62 are shaped so that the lower surface of ribs 62 are coplanar with the lower surface of reinforced region 58. Thus, ribs 62 formed on the underside of the corrugated grooves are shorter than ribs 62 formed on the underside of the corrugated ridges of support body 12. This rib configuration provides bait assembly 10 with considerable stability when support member 12 is positioned on a planar surface. However, the number, size and shape of ribs 62 are subject to considerable variation within the scope of the present invention. Ribs 62 may also be formed on upper surface 22 instead of or in addition to lower surface 24 of support body 12.

Reinforced region 58 and ribs 62 strengthen support body 12 to substantially prevent deformation of support body 12 proximate reservoir 14. The limited flexibility of support body 12 between reinforced region 58 and pointed end 26 permits some bending of support body 12 remote from reservoir 14. Allowing support body 12 to bend may be particularly useful when insect bait assembly 10 is deployed by inserting pointed end 26 into the ground or other soil material. Providing support body 12 with a lesser thickness than reinforced region 58 offers other advantages including minimizing the amount of material required to form support body 12. However, if desired, the thickness of support body 12 may be increased so that the remainder of support body 12 has the same thickness as reinforced region 58.

Support body 12 and reservoir 14 are preferably formed as a one-piece molded plastic member. As is known in the art, support body 12 preferably includes a removal tab 68 or the like to facilitate removal of support body 12 and reservoir 14 from the mold without damaging support body 12 or reservoir 14. Suitable plastic materials include polypropylene himont, pro-fax 6331 or the equivalent. Reservoir cover 18 may be formed of a metal or a plastic material. Although cover 18 is preferably applied after reservoir 14 has been filled with bait 16, in some embodiments of the invention bait 16 may have a composition which may be safely injected into reservoir through aperture 48. Reservoir cover 18 may then be applied to support body 12 before depositing bait 16 in reservoir 14 or cover 18 may be monolithically formed with support body 12 and reservoir 14.

What is claimed is:

1. An insect bait assembly for retaining a volume of insect bait comprising:

(a) an elongate support body having spaced ends, an upper surface and a lower surface; and (b) a reservoir monolithically formed with said support body and having a peripheral wall extending upwardly from said upper surface of said support body and substantially surrounding and defining an interior cavity for holding said volume of insect bait;

(c) said support body having a reinforced region configured for strengthening said support body and resisting deformation of said support body proximate said reservoir;

(d) a reservoir cover having a top covering a major portion of said reservoir and a skirt depending from said top outside of said peripheral wall with said skirt and said peripheral wall providing a pair of telescoped walls shielding said volume of insect bait, and at least one tab engaging said lower surface of said support body to positively secure said cover to said support body.

2. The insect bait assembly of claim 1 wherein, said support body and said peripheral wall are formed as a one-piece molded plastic member.

3. The insect bait assembly of claim 2 wherein, said reinforced region has a first thickness separating said upper surface and said lower surface and a substantial portion of the remainder of said support body has a second thickness separating said upper surface and said lower surface, said first thickness being greater than said second thickness for reinforcing said support body proximate said reservoir.

4. The insect bait assembly of claim 2 wherein, said support body has at least one longitudinally extending rib projecting from one of said upper surface and said lower surface of said support body, said rib reinforcing said support body for resisting bending of said support body about a transverse axis proximate said reservoir.

5. An insect bait assembly for retaining a volume of insect bait comprising:

an elongate support body having spaced ends, an upper surface and a lower surface; and a reservoir monolithically formed with said support body and having a peripheral wall extending upwardly from said upper surface of said support body and substantially surrounding and defining an interior cavity for holding said volume of insect bait;

said support body having a reinforced region configured for strengthening said support body and resisting deformation of said support body proximate said reservoir;

said peripheral wall having a transverse wall portion extending transversely across said support body and a pair of side wall portions extending longitudinally along said support body, said transverse wall portion having a greater height than said side wall portions.

6. The insect bait assembly of claim 5 wherein, said reservoir is positioned proximate one of said spaced ends, and said transverse wall portion of said peripheral wall faces the other of said spaced ends of said support body.

7. An insect bait assembly for retaining a volume of insect bait comprising:

an elongate support body having spaced ends, an upper surface and a lower surface; and a reservoir monolithically formed with said support body and having a peripheral wall extending upwardly from said upper surface of said support body and substantially surrounding and defining an interior cavity for holding said volume of insect bait;

said support body having a reinforced region configured for strengthening said support body and resisting deformation of said support body proximate said reservoir; and a reservoir cover having a top portion covering a major portion of said reservoir, and a skirt portion depending downwardly from said top portion at a position outside of said peripheral wall of said reservoir.

8. An insect bait assembly for retaining an application of insect bait within an insect infested area comprising:

(a) a one-piece molded plastic body including a reservoir having a continuous peripheral wall defining an interior cavity for holding said application of insect bait, and a support body extending longitudinally from at least one side of said reservoir, said support body having a reinforced region exteriorly of said peripheral wall having a thickness dimension strengthening said support body against bending proximate said reservoir; and (b) a reservoir cover having a top portion extending across said reservoir, and a continuous skirt portion depending downwardly from said top portion at a position outside of said peripheral wall, said skirt portion and said peripheral wall providing a pair of telescoped walls shielding said application of insect bait retained in said interior cavity of said reservoir.

9. The insect bait assembly of claim 8 wherein, said reservoir cover has at least one aperture formed therein, said aperture opening into said interior cavity of said reservoir for providing access for insects to said application of insect bait in said interior cavity.

10. The insect bait assembly of claim 8 wherein, said reservoir includes at least one drainage hole formed therein for removal of fluid from said interior cavity.

11. The insect bait assembly of claim 8, and further comprising an application of insect bait positioned in said interior cavity of said reservoir.

12. An insect bait assembly for retaining an application of insect bait within an insect infested area comprising:

a one-piece molded plastic body including a reservoir having a peripheral wall defining an interior cavity for holding said application of insect bait, and a support body extending longitudinally from at least one side of said reservoir, said support body having a reinforced region exteriorly of said peripheral wall having a thickness dimension strengthening said support body against bending proximate and reservoir; and a reservoir cover having a top portion extending across said reservoir, and a skirt portion depending downwardly from said top portion at a position outside of said peripheral wall;

said peripheral wall having a transverse wall portion extending transversely across said support body on said at least one side of said reservoir from which said support body longitudinally extends, and a pair of side wall portions extending longitudinally along said support body, said transverse wall portions having a greater height than said side wall portions.

13. The insect bait assembly of claim 12 wherein, said support body has a pointed end for facilitating insertion of said support body into soil and a transverse second end for driving of said support body into soil with a tool, said reservoir is spaced from said pointed end of said support body, and said transverse portion of said wall is on a side of said reservoir facing said pointed end of said support body.

14. An insect bait assembly for retaining an application of insect bait within an insect infested area comprising:

a one-piece molded plastic body including a reservoir having a peripheral wall defining an interior cavity for holding said application of insect bait, and a support body extending longitudinally from at least one side of said reservoir, said support body having a reinforced region exteriorly of said peripheral wall having a thickness dimension strengthening said support body against bending proximate said reservoir; and a reservoir cover having a top portion extending across said reservoir, and a skirt portion depending downwardly from said top portion at a position outside of said peripheral wall;

said support body having at least one recessed area formed therein, and said reservoir cover having at least one tab positioned in said recessed area, said tab engaging said support body to secure said reservoir cover to said support body.

15. The insect bait assembly of claim 14 wherein, said recessed area is formed in a lower surface of said support body beneath said reservoir, and said reservoir has as interior projection substantially aligned with said recessed area, said interior projection reinforcing said reservoir proximate said recessed area of said support body.

16. An insect bait assembly for retaining an application of insect bait within an insect infested area comprising:

a one-piece molded plastic body including a reservoir having a peripheral wall defining an interior cavity for holding said application of insect bait, and a support body extending longitudinally from at least one side of said reservoir, said support body having a reinforced region exteriorly of said peripheral wall having a thickness dimension strengthening said support body against bending proximate said reservoir; and a reservoir cover having a top portion extending across said reservoir, and a skirt portion depending downwardly from said top portion at a position outside of said peripheral wall;

said support body having a plurality of longitudinally extending ribs formed on one of an upper surface and a lower surface of said support body for reinforcing said support body.

17. The insect bait assembly of claim 13 wherein, said support body has a first end and a second end, said reinforced region is spaced from said first end of said support body, and said ribs extend longitudinally between said first end and said reinforced region of said support body.

18. An insect bait assembly for retaining an application of insect bait within an insect infested area comprising:

a one-piece molded plastic body including a reservoir having a peripheral wall defining an interior cavity for holding said application of insect bait, and a support body extending longitudinally from at least one side of said reservoir, said support body having a reinforced region exteriorly of said peripheral wall having a thickness dimension strengthening said support body against bending proximate said reservoir; and a reservoir cover having a top portion extending across said reservoir, and a skirt portion depending downwardly from said top portion at a position outside of said peripheral wall;

said reinforced region having a first thickness between an upper surface and a lower surface of said support body and a substantial portion of the remainder of said support body having a second thickness between said upper surface and said lower surface, said first thickness being greater than said second thickness.

* * * * *